June 28, 1960 M. ZAIGER 2,942,288
TILTING WINDSHIELD WIPER BLADE
Filed Jan. 31, 1958 2 Sheets-Sheet 1
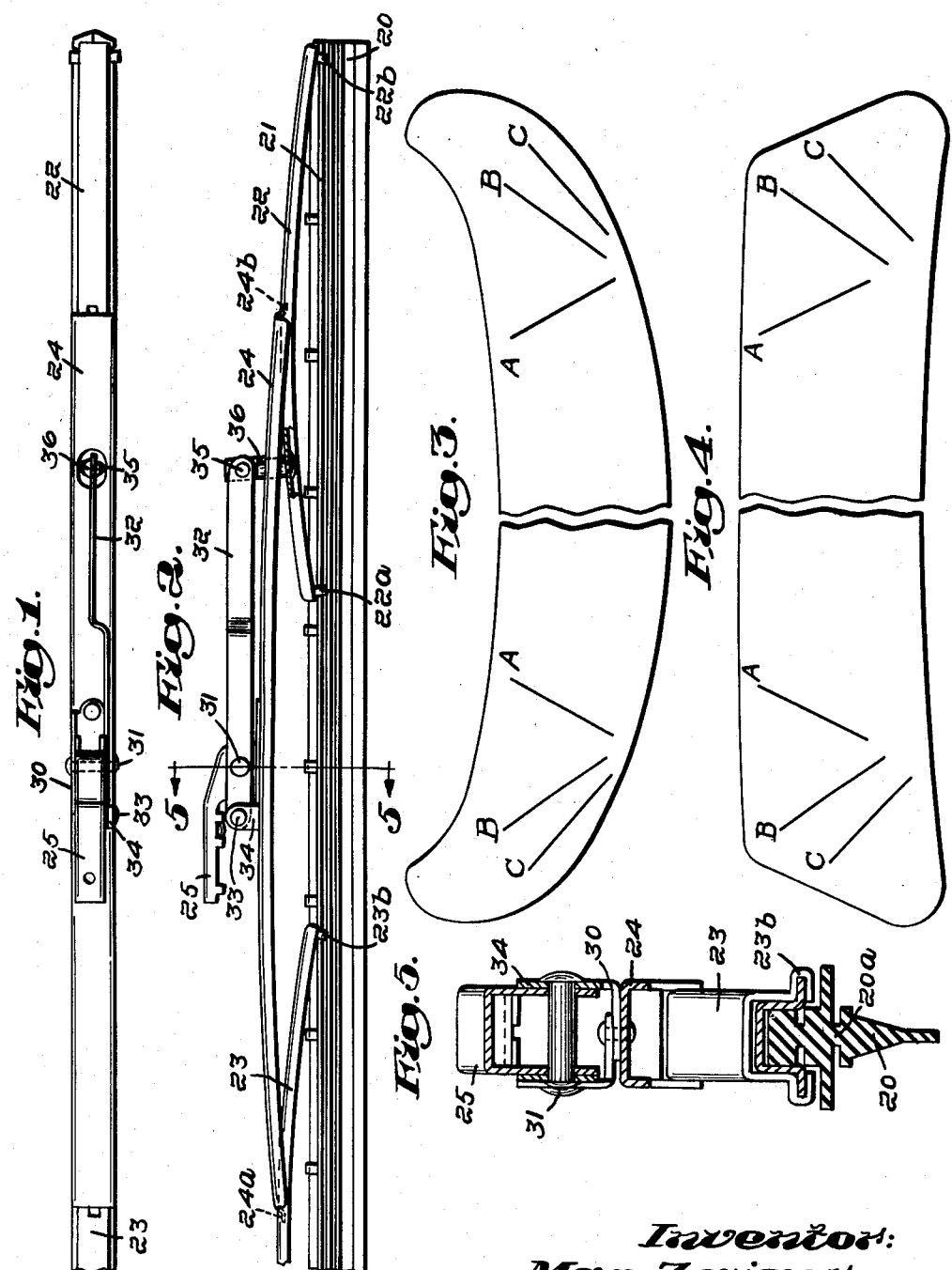
Inventor:
Max Zaiger,
by Arthur D. Thomson
Attorney.

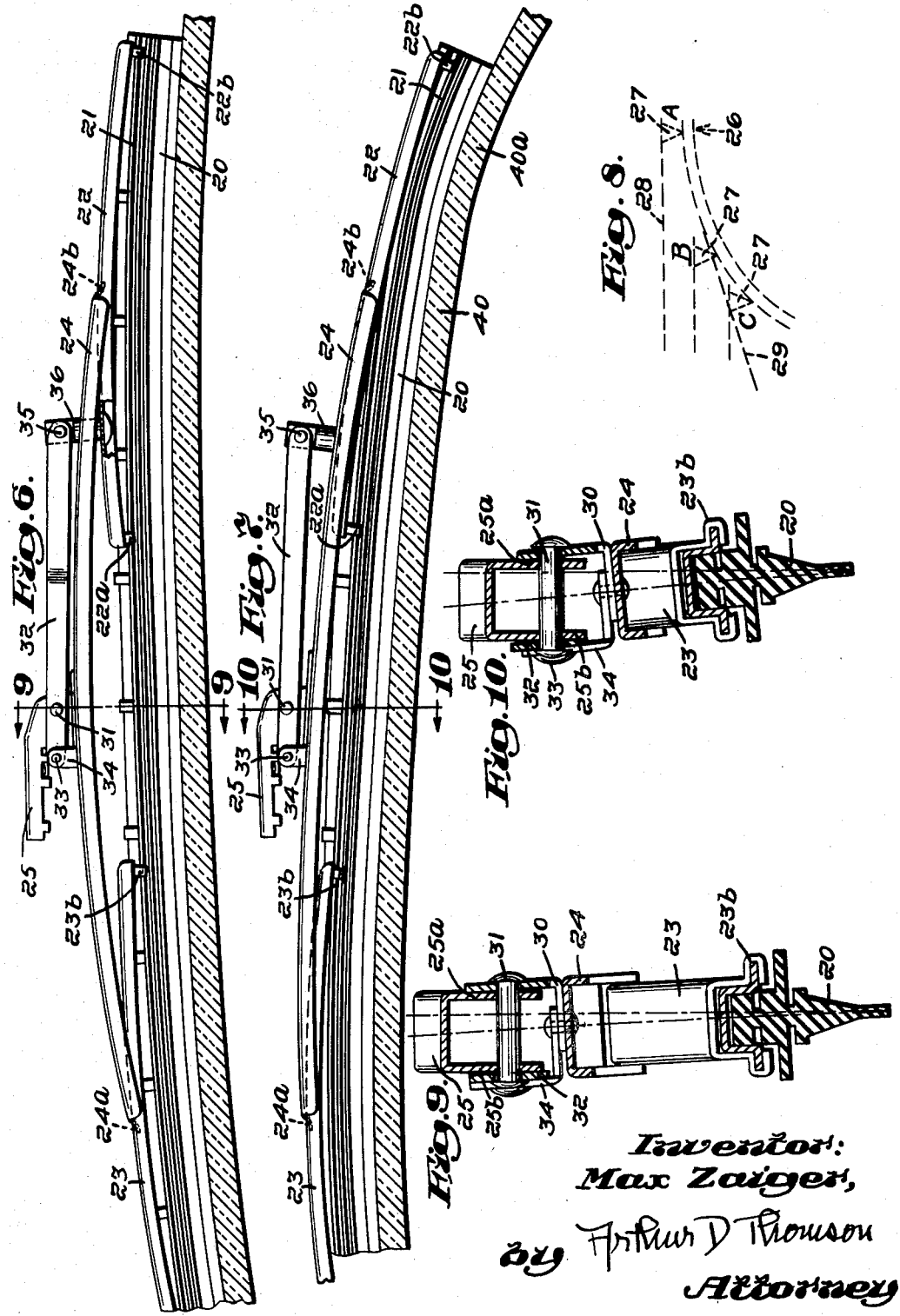

United States Patent Office 2,942,288
Patented June 28, 1960

2,942,288

TILTING WINDSHIELD WIPER BLADE

Max Zaiger, 589 Essex St., Lynn, Mass.

Filed Jan. 31, 1958, Ser. No. 712,554

5 Claims. (Cl. 15—250.33)

This invention relates to windshield wiper blades and more particularly to connector assemblies for mounting a blade on the arm of a wiper drive motor.

Windshields having sharply curved side portions are especially difficult to wipe effectively. One problem is that, due to the changes in plane between various parts of the shield, the wiper blade, in certain positions on the windshield, is presented obliquely to the windshield instead of at right angles. This relative tilting of the blade not only reduces the wiping efficiency but also is likely to bring the metal backer or vertebra, which supports the rubber wiping strip, into contact with the glass and cause scratching.

The principal object of this invention is to provide a mechanism which will automatically tilt the blade to maintain the rubber strip more nearly perpendicular to the glass as the blade from the front passes over the curved side portions. Another object is to provide a blade which is simple, compact, and reliable in operation, and which may be readily applied to conventional wiper arms without any change in the arm itself. Other advantages and novel features will be apparent from the following description.

In the drawings illustrating the invention:

Fig. 1 is a back view of a windshield wiper blade assembly equipped with a tilting connection constructed according to the invention;

Fig. 2 is a side view of the blade in unstressed condition;

Fig. 3 is a development or blank of the glass for a wrap-around windshield;

Fig. 4 is a development or blank of a glass for a windshield intended to be substantially flat or to have moderate uniform overall curvature;

Fig. 5 is an enlarged cross-section taken along lines 5—5 of Fig. 2;

Fig. 6 is an enlarged view, partly broken away, showing the blade disposed on the central or moderately curved portion of a wrap-around windshield as seen from the top of the windshield;

Fig. 7 is a view, partly broken away, of the blade disposed on the corner or sharply curved portion of a wrap-around windshield, as seen from the bottom on the left or driver's side;

Fig. 8 is a schematic illustration showing the plane of the blade with respect to the sharply curved portion of a wrap-around windshield;

Fig. 9 is a cross-section taken along line 9—9 of Fig. 6; and

Fig. 10 is an enlarged cross-section taken along line 10—10 of Fig. 7.

The wiper blade here shown is of a commonly used flexible construction employing a rubber strip 20 having side grooves in which are engaged the inner edges of a slotted flexible metal backer strip 21. The blade holder or superstructure consists of three yokes 22, 23 and 24. Yokes 22 and 23, customarily referred to as the secondary yokes, have pairs of lugs 22a, 22b, and 23a (not shown) and 23b, respectively, at either end which are slidably engaged with the backer strip 21. Yoke 24, customarily referred to as the primary yoke, has tongues 24a and 24b which are engaged in slots in yokes 22 and 23, respectively, to provide a pivotal connection between the primary yoke and the secondary yokes. Attached to yoke 24 is a clip 25 which is here shown as a clip suitable for receiving a bayonet type of wiper arm end but may be a clip for receiving other types of arms. This clip is mounted so as to provide a certain amount of tilt between the blade superstructure and the arm by a structure to be later described.

As indicated schematically in Figs. 3 and 4, a wiper blade in sweeping across a windshield goes through an arc which may be more or less semi-circular, and the three positions indicated in these figures as A, B and C are representative of positions which the blade may assume on the windshield at a particular moment. It is understood that two wipers are ordinarily employed, one for the right-hand side of the windshield and one for the left. When the glass shown in Fig. 3 is in position in an automobile, its ends are rather sharply curved backward with respect to the automobile or in the upward direction with respect to Fig. 3. Fig. 8 illustrates the left-hand corner of such a windshield as seen from the top of the automobile with the arrow 26 indicating the forward direction with respect to the automobile. It is understood that the windshield, as well as being curved at the sides, ordinarily slopes back from bottom to top at the front, and the arm ordinarily swings in oblique planes parallel to the front portion of the glass. This portion of the windshield corresponds to the left-hand portion of the blank of Fig. 3. In Fig. 8 the blade element is schematically illustrated by the dotted triangle 27 having its base on the dot and dash line 28 which indicates the general direction of side to side swing of the wiper arm and the blade assembly. It is understood that the arm is spring-pressed toward the windshield. In the position A the base of the triangle 27 which may be considered to correspond to the plane of the backer strip 21 of the actual blade, is parallel to the windshield surface so that the wiper strip is presented substantially perpendicularly to the windshield. As the blade moves to position B it will be seen that the plane of the base of triangle 27 becomes oblique to the general plane of the windshield, both because of the curvature and because of the backward slope, and as the blade moves to position C, the angle between the base of the triangle 27 and the general plane of the windshield becomes even more acute. If the blade is fixed to the arm in such a manner that there is no relative tilt between the two, it is apparent that the projecting edges of strip 21 and, more particularly, the lugs 22a and 22b of the yoke 22, which is disposed on the upper or outer end of the blade, are likely to strike the glass. Also, the wiper strip 20 is presented sidewise to the glass, and will tend to bend about its neck portion 20, bringing the backer closer to the glass. Furthermore, the pressure from the arm is transmitted at a decidedly oblique angle to the glass so that the wiping action becomes less effective. It is apparent that if the blade itself were tilted to an oblique angle with respect to line 28, for example as indicated by line 29, the strip 21 would be maintained more nearly parallel to the general plane of the windshield as the blade moves to position C. This is achieved in this windshield wiper assembly by the following connecting structure.

The connector 25 is generally channel-shaped and has downwardly extending lugs 25a and 25b. The wiper arm is fixed to this connector. A bracket 30 is fixed to the back of yoke 24. Clip 25 is connected to this bracket by a pin or rivet 31 having heads at each end and passing through a clearance hole in the bracket so as to permit the clip to rotate about the pin and also to tilt with respect to the bracket. A lever arm 32 is rotatably mounted by means of a pin 33 to a second L-shaped bracket 34 which is fixed on yoke 24. Pin 31 also passes through this arm. At its outer end arm 32 is connected by means of a pin 35 to a post 36 which passes through a slot in yoke 24 and is mounted on yoke 22.

As will be seen in Figs. 7, 9, and 10, when the inner end of yoke 22 is tilted toward yoke 24, as in passing on to a curved portion of the windshield, lever 32 is turned by means of post 36 and moves the left-hand end of pin 31, as viewed in Fig. 10, upward with respect to yoke 24, thus causing yoke 24 to become tilted with respect to clip 25 and the arm to which the clip is connected. It is understood that the amount of tilt thus produced between the blade assembly and the wiper arm depends on the dimensions of lever 32 and the position of pin 31 with respect to the fulcrum point 33 of the lever. The curvature of the windshield is somewhat exaggerated in Fig. 8 for purposes of illustration. An actual windshield is shown in Fig. 7, designated by the numeral 40, and it is apparent that a moderate tilt between the blade assembly and the connector 25, as shown in Fig. 10, will be sufficient to bring strip 20 more nearly perpendicular to the side part of the windshield and to prevent lugs 22b and the edges of strip 21 from striking the glass, because these parts are initially spaced from the glass by the rubber strip 20.

An automobile is ordinarily equipped with two windshield wipers. The connector here shown is intended for the left, or driver's side of the car. For the blade on the right side, the arrangement of brackets 30 and 34 and lever 32 would be reversed so that the blade would tilt in the opposite direction with respect to the arm.

The connector here described involves only minor modifications to the blade and does not add materially to the cost or bulk of the blade. The tilting action is always perfectly synchronized with the movement of the arm, because the action depends directly on the bending of the blade according to the curvature of the windshield. This construction is thus more reliable than, for example, a mechanism designed to tilt the arm itself in timed relationship with the sidewise swing. No modification of the arm is required when this connector is used. It is, of course, understood that clips for receiving any type of arm may be mounted in the same manner as clip 25.

It is understood that the lever arrangement here described could be applied to either of the secondary yokes, depending on which one engages a sharply curved surface at a position in which it is desirable to tilt the blade with respect to the arm.

What is claimed is:

1. A connector, for a windshield wiper blade of the type including a first yoke and a second yoke tiltably connected thereto, comprising a clip adapted to receive a wiper arm, a lever arm disposed longitudinally of the blade, means pivotally connecting said lever to said first yoke, means connecting said lever to said second yoke, means connecting said clip to said lever at a point removed from the means connecting the lever to the first and second yokes, and means connecting said clip to said first yoke and adapted to permit sidewise tilting of said clip with respect to said first yoke.

2. A connector, for a windshield wiper blade of the type including a first yoke and a second yoke tiltably connected thereto, comprising a clip adapted to receive a wiper arm, a lever arm disposed longitudinally of the blade, said lever arm having one end pivotally connected to said first yoke and another end pivotally connected to said second yoke, said clip being disposed intermediate the lever arm ends and having a first side portion connected to said lever and a second side portion connected to said first yoke in such a manner as to permit sidewise tilting of said clip with respect to said first yoke.

3. A connector, for a windshield wiper blade of the type including a first yoke and a second yoke tiltably connected thereto, comprising a clip adapted to receive a wiper arm, a lever arm disposed longitudinally of the blade, said lever having one end pivotally connected to said first yoke and another end pivotally connected to said second yoke, a bracket on said first yoke disposed between said lever arm ends, and a pin engaged with said bracket and said lever and disposed transversely across said first yoke, said clip being mounted on said pin intermediate said bracket and said lever, and said pin being tiltable with respect to the bracket to permit sidewise tilting of the clip with respect to the blade.

4. A connector, for a windshield wiper blade of the type including a first yoke, a second yoke, and a pivotal connection between said yokes, comprising a clip adapted to receive a wiper arm and disposed on said first yoke, a post mounted on said second yoke and passing freely through said first yoke intermediate said clip and said pivotal connection, a lever arm having one end pivotally connected to said post and another end pivotally connected to said first yoke, said clip being disposed intermediate said arm ends and having depending lugs spaced transversely of the blade, a bracket on said first yoke, means connecting one of said lugs to said bracket to permit sidewise tilting of the clip with respect to the blade, the other of said lugs being connected to said lever arm.

5. A connector as described in claim 4, having a pin passing through both lugs, the bracket and the lever arm, the pin being loosely received in the bracket.

References Cited in the file of this patent

UNITED STATES PATENTS 2,752,626   Oishei _____ July 3, 1956